US012644754B2

(12) United States Patent
Ozbag

(10) Patent No.: US 12,644,754 B2
(45) Date of Patent: Jun. 2, 2026

(54) WEIGHING UNIT USED FOR DETERMINING HAZELNUT PRODUCTIVITY IN HAZELNUT PROCESSING PLANTS

(71) Applicant: BALSU GIDA SANAYI VE TICARET ANONIM SIRKETI, Sakarya (TR)

(72) Inventor: Nusret Ozbag, Sakarya (TR)

(73) Assignee: BALSU GIDA SANAYI VE TICARET ANONIM SIRKETI, Sakarya (TR)

( * ) Notice: Subject to any disclaimer, the term of this patent is extended or adjusted under 35 U.S.C. 154(b) by 302 days.

(21) Appl. No.: 18/290,455

(22) PCT Filed: Feb. 24, 2022

(86) PCT No.: PCT/TR2022/050167
§ 371 (c)(1),
(2) Date: Nov. 14, 2023

(87) PCT Pub. No.: WO2022/260620
PCT Pub. Date: Dec. 15, 2022

(65) Prior Publication Data
US 2024/0255342 A1 Aug. 1, 2024

(30) Foreign Application Priority Data
Jun. 8, 2021 (TR) ............................... 2021/009412

(51) Int. Cl.
*G01G 13/18* (2006.01)

(52) U.S. Cl.
CPC .................................... *G01G 13/18* (2013.01)

(58) Field of Classification Search
CPC ....................................................... G01G 13/18
See application file for complete search history.

(56) References Cited

U.S. PATENT DOCUMENTS

| | | | | |
|---|---|---|---|---|
| 2,904,304 A | | 9/1959 | Zwoyer et al. | |
| 3,091,369 A | * | 5/1963 | Sackett, Sr. ........... | B01F 25/822 366/11 |
| 3,494,434 A | * | 2/1970 | Rivers .................... | G01G 21/00 414/609 |
| 3,589,458 A | * | 6/1971 | Schwake ................. | B65B 37/18 177/122 |
| 4,708,215 A | * | 11/1987 | Nakamura ........... | G01G 13/026 177/25.18 |

(Continued)

FOREIGN PATENT DOCUMENTS

| | | | |
|---|---|---|---|
| CN | 214613418 U | * | 11/2021 |
| EP | 3767254 A1 | | 1/2021 |

*Primary Examiner* — Natalie Huls
(74) *Attorney, Agent, or Firm* — Bayramoglu Law Offices

(57) ABSTRACT
A weighing unit can be used to determine the ratio between the weights of shelled hazelnuts and hazelnut kernels to determine productivity in hazelnut processing plants. The weighing unit includes at least one second chamber in which the hazelnut to be weighed is accumulated in the weighing unit, at least one load cell to which the second chamber is connected to determine the weight of the hazelnut, and at least one first chamber in which hazelnuts can be accumulated so that the hazelnuts needed by the second chamber are fed quickly.

6 Claims, 2 Drawing Sheets

(56)            References Cited

U.S. PATENT DOCUMENTS

| | | | | |
|---|---|---|---|---|
| 5,084,832 | A * | 1/1992 | Yamada ............. | G01G 23/3721 |
| | | | | 177/25.18 |
| 5,340,949 | A * | 8/1994 | Fujimura ............... | G01G 17/04 |
| | | | | 426/231 |
| 5,379,923 | A * | 1/1995 | Sagastegui ............. | G01G 13/18 |
| | | | | 222/181.2 |
| 7,855,343 | B2 | 12/2010 | Nakagawa et al. | |
| 2010/0044116 | A1 * | 2/2010 | Kishikawa .............. | B65B 37/18 |
| | | | | 177/25.18 |
| 2022/0276087 | A1 * | 9/2022 | Kageyama ........... | G01G 19/387 |
| 2023/0381819 | A1 * | 11/2023 | Ozbag ..................... | B07B 11/06 |
| 2024/0253081 | A1 * | 8/2024 | Ozbag ..................... | B07C 5/342 |

* cited by examiner

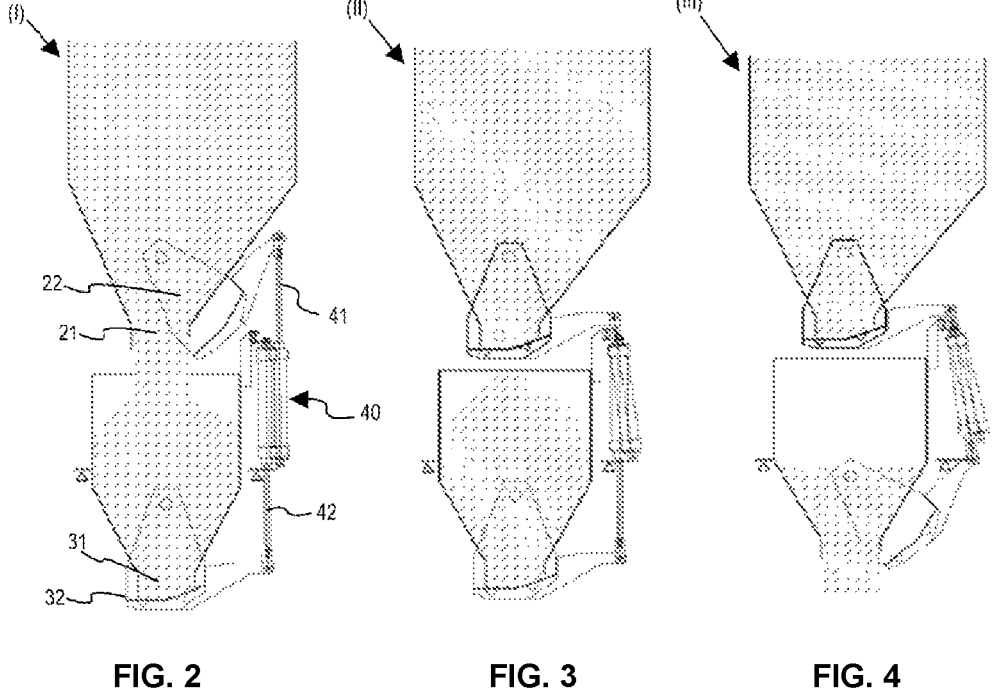
FIG. 2                    FIG. 3                    FIG. 4

WEIGHING UNIT USED FOR DETERMINING HAZELNUT PRODUCTIVITY IN HAZELNUT PROCESSING PLANTS

CROSS REFERENCE TO THE RELATED APPLICATIONS

This application is the national phase entry of International Application No. PCT/TR2022/050167, filed on Feb. 24, 2022, which is based upon and claims priority to Turkish Patent Application No. 2021/009412, filed on Jun. 8, 2021, the entire contents of which are incorporated herein by reference.

TECHNICAL FIELD

The invention relates to at least one weighing unit that can be used to determine the ratio between the weights of shelled hazelnuts and hazelnut kernels to determine productivity in hazelnut processing plants.

BACKGROUND

Hazelnut processing plants include the process steps of the shelled hazelnuts until they are turned into hazelnut kernels. These process steps include cracking, cleaning, packaging of the hazelnut, etc. The hazelnuts, which are subjected to cracking and cleaning process in the hazelnut processing plants, are then supplied to the market.

In the hazelnut processing plant, there is a continuous decrease in the amount of hazelnut as it passes through the process steps such as sieving, cracking, and separation in the process steps from the entrance to the exit. In the final case, cleaned hazelnut kernels are obtained. The ratio between the shelled hazelnuts taken to the hazelnut processing plant and the hazelnut kernels shows the productivity of the hazelnut. In the current art, the efficiency of hazelnut is determined by the ratio of the shelled hazelnuts taken during the hazelnut harvesting season to the hazelnut kernels obtained during the season.

The fact that hazelnut yield can be determined in this way from the beginning of the season to the end of the season according to the proportion of the obtained products in the current art has disadvantages. The first of these is that the efficiency of the system cannot be determined during hazelnut harvesting. This may cause hazelnut processing plants not to operate at the planned productivity and high cost purchases during the season. In addition, the yield of each hazelnut orchard may not be the same. In this case, it is not possible to determine the yield difference between hazelnut orchards. In this case, there is no sustainable hazelnut processing process and sustainable hazelnut production. The fact that the hazelnut processing plant cannot determine the hazelnut yield instantly has remained an area open to development for today's technology.

As a result, all the problems mentioned above made it necessary to make an innovation in the related technical field.

SUMMARY

The present invention relates to a weighing unit in order to eliminate the above-mentioned disadvantages and to bring new advantages to the relevant technical field.

An object of the invention is to provide a weighing unit for use in hazelnut processing plants.

Another object of the invention is to provide a weighing unit that can determine the hazelnut weight at the entrance and exit of hazelnut processing plants.

Another object of the invention is to provide a weighing unit to be used in determining hazelnut yield in hazelnut processing plants.

In order to realize all the objects mentioned above and which will emerge from the detailed description below, the present invention is at least one weighing unit that can be used to determine the ratio between the weights of shelled hazelnuts and hazelnut kernels to determine productivity in hazelnut processing plants. Accordingly, its innovation is that it includes at least one second chamber in which the hazelnut to be weighed is accumulated in the said weighing unit, at least one load cell to which the said second chamber is connected to determine the weight of the hazelnut, and at least one first chamber in which hazelnuts can be accumulated so that the hazelnuts needed by the second chamber are fed quickly. Thus, the weight of the hazelnut is determined in the hazelnut processing plant.

A feature of a possible embodiment of the invention is that it is provided separately for shelled hazelnuts and hazelnut kernels in the hazelnut processing plant. Thus, it is possible to determine the weight of the shelled hazelnuts and the remaining hazelnut kernels after processing the shelled hazelnuts.

The feature of another possible embodiment of the invention is that the first chamber contains at least one first opening that can allow the hazelnut to be dropped, and at least one first cover that can at least partially restrict the passage of hazelnuts from the said first opening. Thus, the hazelnut is passed from the first chamber to the second chamber.

The feature of another possible embodiment of the invention is that the second chamber contains at least one second opening that can allow the hazelnut to be dropped, and at least one second cover that can at least partially restrict the passage of hazelnuts from the said second opening. Thus, the hazelnut is passed from the second chamber to the next operation.

The feature of another possible embodiment of the invention is that at least one of said first cover and said second cover is configured to rotate. Thus, it is ensured that the hazelnut is least damaged during the stopping of the passage of the hazelnut.

The feature of another possible embodiment of the invention is that it contains at least one drive element to which it is connected to move at least one of the first cover and the second cover. Thus, the first cover and the second cover are opened and closed using mechanical power.

The feature of another possible embodiment of the invention is that said drive element contains at least one first piston to activate the first cover and at least one second piston to activate the second cover. Thus, the first cover and the second cover are opened and closed using mechanical power.

BRIEF DESCRIPTION OF THE DRAWINGS

FIG. 2 shows a representative first position view of the weighing unit of the invention.

FIG. 3 shows a representative second position view of the weighing unit of the invention.

FIG. 4 shows a representative third position view of the weighing unit of the invention.

REFERENCE NUMBERS GIVEN IN THE FIGURES

Figure 1:
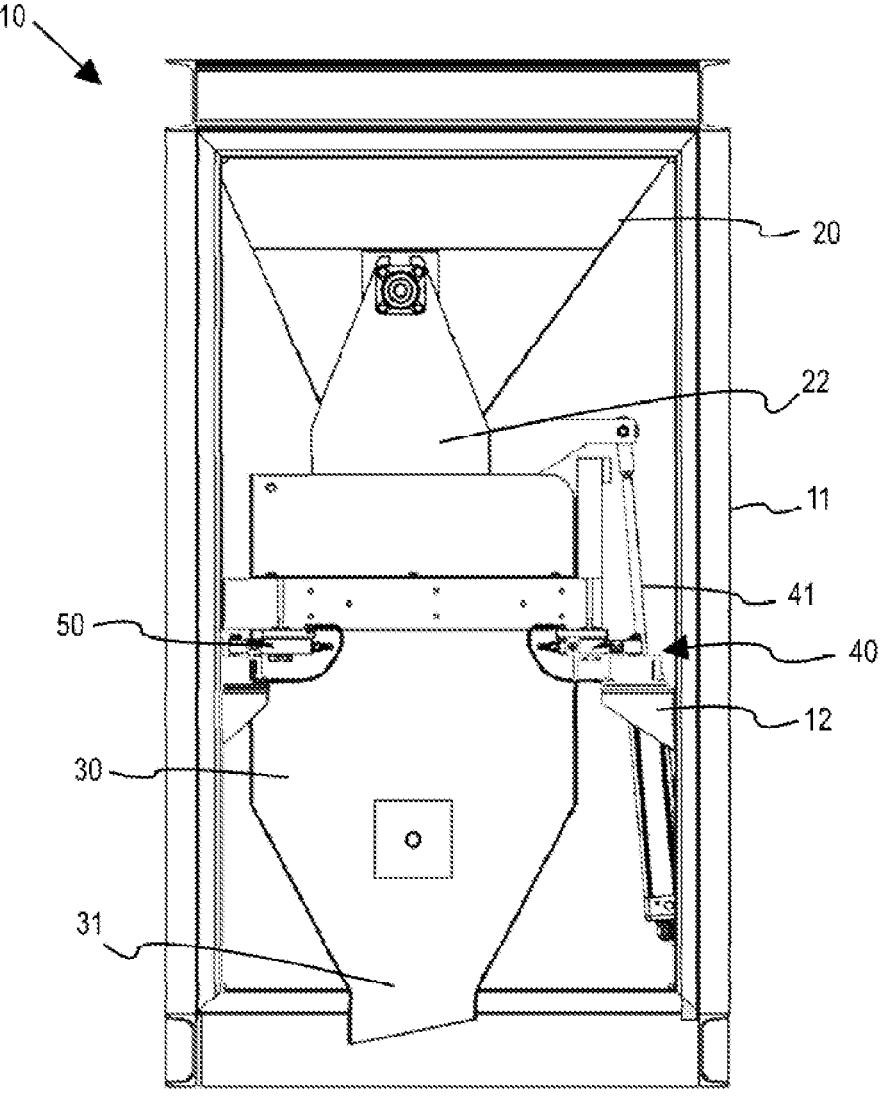
FIG. 1 shows a representative side view of the weighing unit of the invention.

10 Weighing Unit
11 Chassis
12 Ledge
20 First Chamber
21 First Opening
22 First Cover
30 Second Chamber
31 Second Opening
32 Second Cover
40 Drive Element
41 First Piston
42 Second Piston
50 Load Cell
(I) First Position
(II) Second Position
(III) Third Position

DETAILED DESCRIPTION OF THE EMBODIMENTS

In this detailed description, subject matter of the invention is explained with examples that will not have any limiting effect, for better understanding the subject matter.

FIG. 1 shows a representative side view of the weighing unit (10) of the invention. Accordingly, the said weighing unit (10) is used to determine the weight of the hazelnut, especially in hazelnut processing plants. The said hazelnut processing plant is a processing process that includes the process steps such as pre-cleaning, cracking, sieving, laser, packaging, etc., from the shelled hazelnuts to the hazelnut kernels. In this hazelnut processing plant, the weight of the shelled hazelnuts and the hazelnuts that are processed into hazelnut kernels are determined by the said weighing unit (10). There are at least two weighing units (10) in the hazelnut processing plant to weigh the shelled hazelnuts and the hazelnut kernels. Depending on the data obtained from these two weighing units (10), hazelnut yield can be determined.

The weighing unit (10) essentially works on the working principle of the extraction scale known in the art. In order to do this, there is at least one chassis (11) on the weighing unit (10). Said chassis (11) is essentially the body of the weighing unit (10). There is at least one first chamber (20) and at least one second chamber (30) on the weighing unit (10). In a possible embodiment of the invention, said first chamber (20) and second chamber (30) are positioned on top of each other on the chassis (11). It allows the positioning of shelled hazelnuts or kernels in the first chamber (20) and the second chamber (30). In order to do this, the first chamber (20) and the second chamber (30) are formed with an internal cavity, with at least partially open top and conical lower parts.

There is at least one first opening (21) on the side of the first chamber (20) facing the second chamber (30). On the other hand, there is at least one second opening (31) on the side of the second chamber (30) facing the floor. While the said first opening (21) allows the hazelnuts in the first chamber (20) to be dropped into the second chamber (30), the said second opening (31) allows the hazelnuts in the second chamber (30) to be transferred to the next processing stage. There are unweighed hazelnuts in the first chamber (20). The purpose of use of the first chamber (20) is that the second chamber (30) can be filled quickly if it needs hazelnuts. The hazelnuts are dropped from the first chamber (20) to the second chamber (30). Passing the hazelnut into the second chamber (30) is provided depending on the force of gravity. In this way, the need for extra energy or equipment is eliminated during the relocation of the hazelnut between the first chamber (20) and the second chamber (30).

There is at least one first cover (22) on the first chamber (20). Said first cover (22) is positioned around the first opening (21) in order to allow the flow of hazelnuts from the first chamber (20) to the second chamber (30) to be managed. In a possible embodiment of the invention, the first cover (22) is configured to open and close the first opening (21) by at least partially rotating. This rotational movement prevents the hazelnuts from being damaged when the first chamber (20) is opened and closed.

There is at least one second cover (32) on the second chamber (30). Said second cover (32) is positioned around the second opening (31) such that it allows to control the hazelnut flow from the second chamber (30) to the next process step. In a possible embodiment of the invention, the second cover (32) is configured to open and close the second opening (31) by at least partially rotating. This rotational movement prevents the hazelnuts from being damaged when the second chamber (30) is opened and closed.

The first cover (22) and the second cover (32) are connected to at least one drive element (40). Said drive element (40) is configured to open and close at least one of the first cover (22) and the second cover (32) with a rotational movement. In a possible embodiment of the invention, the drive element (40) has at least one first piston (41) and at least one second piston (42). Said first piston (41) is associated with the first cover (22), and said second piston (42) is associated with the second cover (32). The first piston (41) and the second piston (42) cause the first cover (22) and the second cover (32) to open and close by stretching out at least partially. The positions of the first cover (22) and the second cover (32) can be determined by the sensors that can be positioned on the first piston (41) and the second piston (42). Thus, the system can be automated.

In the weighing unit (10), the first chamber (20) is positioned directly on the chassis (11). On the other hand, the second chamber (30) is connected to the chassis (11) such that there is at least one load cell (50) between them. Said load cell (50) is a type of converter used to convert the applied force into an electrical signal. With a mechanical arrangement in this conversion, the perceived force changes the shape of a strain gauge and measures the shape change of the strain gauge as an electrical signal. Thus, it is allowed to determine the weight of the hazelnut in the second chamber (30). The load cell (50) is positioned on at least one ledge (12) provided on the chassis (11). With the said ledge (12), it is ensured that the load cell (50) can be placed according to the form of the second chamber (30). There are essentially two load cells (50) on opposite sides of the second chamber (30). In this way, the sensitivity of determining the weight of the second chamber (30) is improved.

In a possible use of the invention, the structure will be explained below by being supported by figures.

FIG. 2 shows a representative first position (I) view of the weighing unit (10) of the invention. In the said first position (I), the hazelnuts in the first chamber (20) can be poured from the first opening (21) to the second chamber (30). During this process, the second opening (31) on the second chamber (30) is kept closed by the second cover (32). During this process, the load cell (50) instantly determines the weight of the second chamber (30). When the weight of the second chamber (30) reaches a predetermined amount, the weighing unit (10) is moved from the first position (I) to a second position (II).

FIG. 3 shows a representative second position (II) view of the weighing unit (10) of the invention. In this second position (II), no hazelnut flow is provided from the first chamber (20) to the second chamber (30). In this position, the weighing process is completed and the weighing result can be saved in a predetermined memory unit. Subsequently, the weighing unit (10) is moved from second position (II) to third position (III).

FIG. 4 shows a representative third position (III) view of the weighing unit (10) of the invention. Accordingly, said third position (III) is the position that allows the hazelnuts weighed in the second chamber (30) to be discharged. While this is in the third position (III), the first cover (22) closes the first opening (21) while the second opening (31) is opened by the second cover (32) and the hazelnuts are discharged. Thus, it is ensured that the shelled hazelnuts or kernels processed in the hazelnut processing plant are weighed and forwarded between operations.

As mentioned, there are at least two of these weighing units (10) provided at the hazelnut processing plant for shelled hazelnuts and hazelnut kernels. Depending on the results of measurement made between these two weighing units (10), the yield is determined by taking the difference in weight of the entering shelled hazelnuts and the exiting shelled hazelnuts. This determination can be made for a specific hazelnut cluster, it also allows determination at certain time intervals. Thus, it is ensured that yield determination in hazelnut processing plants can be best done with a mechanical weighing unit (10).

The scope of protection of the invention is specified in the attached claims and it cannot be limited to what is explained in this detailed description for the sake of example. It is clear that a person skilled in the art can provide similar embodiments in the light of the above, without departing from the main theme of the invention.

What is claimed is:

1. A weighing unit, configured to determine a ratio between weights of shelled hazelnuts and hazelnut kernels to determine productivity in a hazelnut processing plant, and comprising:

at least one second chamber in which hazelnuts to be weighed are accumulated in the weighing unit, at least two load cells arranged on opposite sides of the at least one second chamber, the at least two load cells being configured to determine a weight of the hazelnuts accumulated in the at least one second chamber, at least one first chamber in which hazelnuts are accumulated so that the hazelnuts needed by the at least one second chamber are fed quickly, wherein the at least one first chamber contains a first opening configured to allow the hazelnut to be dropped, and at least one first cover configured to at least partially restrict a passage of hazelnuts from the first opening, wherein the at least one second chamber contains a second opening configured to allow the hazelnut to be dropped, and at least one second cover configured to at least partially restrict a passage of hazelnuts from the second opening, wherein at least one of the first cover and at least one second cover are configured to rotate, wherein the weighing unit contains at least one drive element, wherein the at least one drive element is mounted on a chassis and contains a first piston to move the at least one first cover and a second piston to move the at least one second cover, wherein sensors are positioned on the first piston and the second piston to determine positions of the at least one first cover and the at least one second cover, and wherein the at least one first chamber is positioned directly on the chassis, and the at least one second chamber is connected to the chassis such that the at least two load cells are positioned between the at least one second chamber and the chassis, the at least two load cells being positioned on at least one ledge provided on the chassis.

2. The weighing unit according to claim 1, wherein the hazelnut processing plant comprises at least two weighing units according to claim 1, one provided to weigh shelled hazelnuts and another provided to weigh hazelnut kernels.

3. The weighing unit according to claim 1, wherein the first piston is mechanically associated with the at least one first cover and the second piston is mechanically associated with the at least one second cover.

4. The weighing unit according to claim 1, wherein the at least one first chamber and the at least one second chamber are positioned on top of each other on the chassis.

5. The weighing unit according to claim 1, wherein the at least one first chamber and the at least one second chamber each comprise an internal cavity having an at least partially open top and a conical lower part.

6. The weighing unit according to claim 1, wherein the at least one first opening is located on a side of the at least one first chamber facing the at least one second chamber, and the at least one second opening is located on a side of the at least one second chamber facing the floor.

* * * * *